United States Patent [19]
Ueshima et al.

[11] 3,856,758
[45] Dec. 24, 1974

[54] POLYMERS OF CYANO-SUBSTITUTED NORBORNENE DERIVATIVES AND METHOD FOR PREPARING THE SAME

[75] Inventors: Takashi Ueshima, Yokohama; Shoichi Kobayashi; Masami Matsuoka, both of Tokyo, all of Japan

[73] Assignee: Showa Denko K.K., Tokyo, Japan

[22] Filed: Mar. 27, 1973

[21] Appl. No.: 345,437

[30] Foreign Application Priority Data
  Mar. 31, 1972   Japan............................... 47-31755
  Nov. 1, 1972   Japan............................. 47-108902

[52] U.S. Cl....... 260/78.4 N, 260/78.5 N, 260/80 C, 260/82.5, 260/85.5 M, 260/85.5 L, 260/88.7 C, 260/88.7 E
[51] Int. Cl............................. C08f 1/28, C08f 5/00
[58] Field of Search..... 260/78.4 N, 78.4 R, 78.5 N, 260/78.5 R, 85.5 M, 85.5 L, 88.7 C, 88.7 E, 80 C, 82.5

[56] References Cited
UNITED STATES PATENTS
2,721,189   10/1955   Anderson........................... 260/93.1
2,932,630   4/1960   Robinson et al................... 260/93.1

Primary Examiner—Joseph L. Schofer
Assistant Examiner—John Kight, III
Attorney, Agent, or Firm—Kemon, Palmer & Estabrook

[57] ABSTRACT

Polymers prepared with a reduced viscosity of 0.1 to 20 by ring-opening polymerization of cyano-substituted norbornene derivatives, whose chemical structure may be expressed by the following general formula:

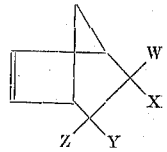

radical
where:
  W, X, Y and Z = radicals selected from the group consisting of hydrogen, nitrile group, substituents including nitrile group, alkyl radical having 1 to 20 carbon carbon atoms, alkenyl radical having 1 to 20 carbon atoms, aryl radical having 6 to 20 carbon atoms and aralkyl radical having 7 to 20 carbon atoms; and at least one of said W, X, Y and Z is the racidical selected from the group consisting of nitrile group and substituents including nitrile group.

31 Claims, 4 Drawing Figures

POLYMERS OF CYANO-SUBSTITUTED NORBORNENE DERIVATIVES AND METHOD FOR PREPARING THE SAME

This invention relates to novel polymers prepared with various prominent properties by ring-opening polymerization of cyano-substituted norbornene derivatives and a method for manufacturing the same. An article by R. E. Rinechart appearing in the Journal of Polymer Science (1969) Part C, No. 27, pages 7 to 25 and the Japanese Patent Publications Nos. 22,705/67 and 7,522/68 point out that a new type of polymer can be obtained by subjecting to ring-opening polymerization cycloolefins such as cyclooctene, cyclopentene, cyclobutene, cyclooctadiene and norbornene in an organic solvent selected from aromatic hydrocarbons such as toluene, aliphatic hydrocarbons such as n-heptane and lower alcohols such as methyl alcohol, using a catalyst prepared from halides of noble metals such as ruthenium, osmium and iridium or halides of transition metals such as titanium, molybdenum, tungsten and vanadium.

However, a joint report by Francis W. Michelotti and William P. Keaveneg appearing in the Journal of Polymer Science (1965), Part A, vol. 3, pages 895 to 905 discloses that 5-chloromethyl-2-norbornene, a derivative of norbornene, can indeed be formed into fibrous polymer when subjected to ring-opening polymerization, using a catalyst of ruthenium compounds, whereas 5-cyano-2-norbornene, namely, 5-cyanobicyclo [2, 2, 1]-heptene-2 can not provide a polymer even when subjected to ring-opening polymerization, using a catalyst of compounds of ruthenium, osmium or iridium. As seen from the foregoing description, some of the derivatives of cycloolefins, particularly those of norbornene can be made into polymers by ring-opening polymerization, using a certain kind of a catalytic system, whereas the others of said norbornene derivatives can not be expected to admit of ring-opening polymerization even when the same kind of catalytic system is used. In fact, cyano-substituted norbornene derivatives such as the aforesaid 5-cyano-2-norbornene have not been polymerized up to the present time.

The present inventors have conducted studies on the ring-opening polymerization of cyano-substituted norbornene derivatives. As the result, it has been found that novel polymers can be prepared by ring-opening polymerization of cyano-substituted norbornene derivatives, using a catalytic system consisting of compounds of tungsten and/or those of molybdenum and organic aluminium compounds. It has also been disclosed that said novel polymer can not be produced by ring-opening polymerization of cyano-substituted norbornene derivatives, using a catalytic system consisting of compounds of titanium and/or those of vanadium and organic aluminium compounds.

The present invention provides novel polymers prepared with a reduced viscosity of 0.1 to 20 by ring-opening polymerization of cyano-substituted norbornene derivatives expressed by the following general formula:

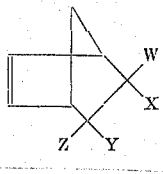

where:
W, X, Y and Z = radicals selected from the group consisting of hydrogen, nitrile group, substituents containing nitrile group, alkyl radical having 1 to 20 carbon atoms, alkenyl radical having 1 to 20 carbon atoms, aryl radical having 6 to 20 carbon atoms and aralkyl radical having 7 to 20 carbon atoms; and at least one of said W, X, Y and Z is the radical being selected from the group consisting of nitrile group and substituents containing nitrile group.

Further, the method of this invention comprises subjecting cyano-substituted norbornene derivatives expressed by the above general formula to ring-opening polymerization in the presence of a catalytic system consisting of compounds of tungsten and/or those of molybdenum and organic aluminium compounds or all these compounds with which there is mixed at least one compound selected from the group consisting of water, peroxides, epoxides, organic halides, acetal compounds, orthocarbonic acid esters and alcoholic compounds.

Novel polymers prepared as described above according to the method of this invention are of a photodegradation type which readily decomposes upon exposure to sunlight and are further characterized by prominent surface hardness, impact strength, tensile strength, solvent resistance and gas barrier property.

The present invention can be more fully understood from the following detailed description when taken in connection with reference to the accompanying drawings, in which.

Figure 1:
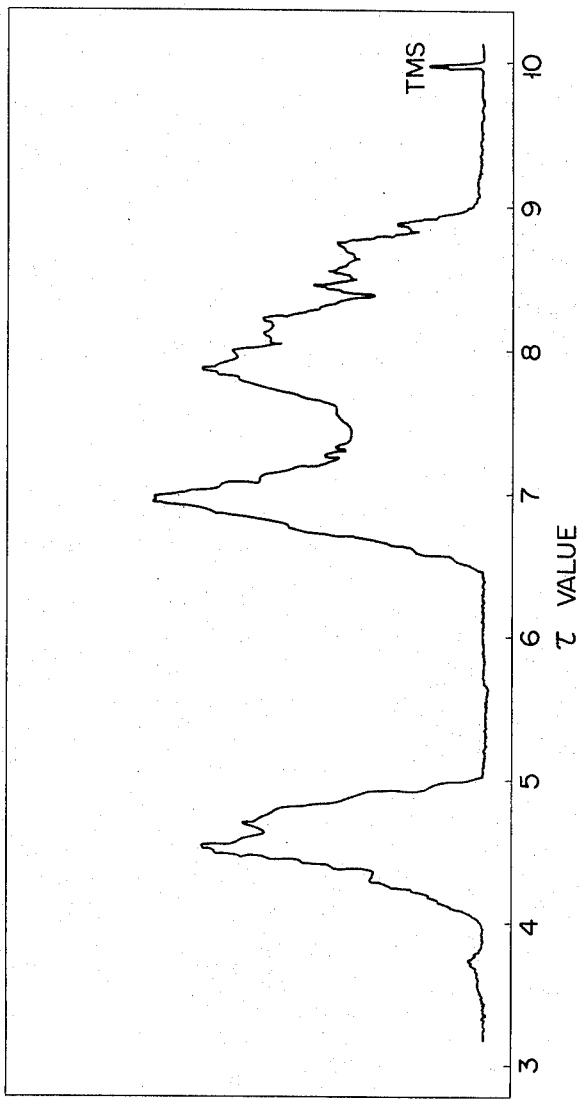
FIG. 1 is a diagram of the nuclear magnetic resonance spectrum of the polymer of this invention obtained in Example 29.

Cyano-substituted norbornene derivatives used as a monomer in preparing the polymers of this invention contain at least one nitrile group or substituent including nitrile group in the position of 5 and/or 6 of bicyclo [2, 2, 1]-heptene-2 as indicated in the following general formula representing the chemical structure of said monomer:

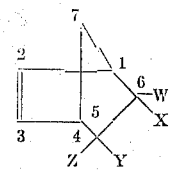

where:
W, X, Y and Z represent the aforementioned radicals.

The aforesaid substituents having nitrile group include the cyano methyl radical, cyanoethyl radical, cyanopropyl radical, cyano-n-butyl radical, cyanoisobutyl radical and ω-cyano-n-heptyl radical. The hydrocarbon radicals include the methyl radical, ethyl radical, propyl radical, n-butyl radical, isobutyl radical, octyl radical, phenyl radical, cyclohexyl radical and 2-octenyl radical.

The monomers used in the method of this invention whose chemical structure may be expressed by the above-mentioned general formula can be prepared by reacting cyclopentadiene with acrylonitrile or other vinyl compounds containing the nitrile group, namely, by Diels-Alder reaction (refer to an article by H. L. Holmes appearing in "Organic Reaction," Vol. 4, pages 60 to 173, published in 1948 by John Wiley and Sons, Inc.). Said monomers may also be obtained by reacting dicyclopentadiene with acrylonitrile or other vinyl compounds containing the nitrile group. The vinyl compounds bearing the nitrile group which may be used in said reaction include methacrylonitrile, α-n-octyl acrylonitrile, vinylidene cyanide, fumaronitrile, maleonitrile, allylcyanide, cinnamonitrile and linolonitrile. From said acrylonitrile or vinyl compounds bearing the nitrile group are derived through the aforesaid Diels-Alder reaction, 5-cyano bicyclo[2,2,1]-heptene-2, 5-cyano-5-methyl bicyclo [2, 2, 1]-heptene-2, 5-cyano-5-n-octyl bicyclo [2, 2, 1]-heptene-2, 5,5-dicyano bicyclo[2, 2, 1]-heptene-2, 5,6-dicyano bicyclo [2, 2, 1]-heptene-2, 5-cyano-6-phenyl bicyclo [2, 2, 1]-heptene-2, and a mixture of 5-ω-cyano-n-heptyl,6-n-2-octenyl bicyclo [2, 2, 1]-heptene-2 and 5-ω-cyano-2-decenyl,6-n-pentyl bicyclo [2, 2, 1]-heptene-2. The substituent may take the endo or exo position. Though the cyano-substituted norbornene derivatives consist of two groups of isomers represented by the endo and exo positions occupied by the substituent radicals, yet said different groups of isomers can be effectively separated from each other by precision distillation. The endo type isomer, for example, 5-cyano-bicyclo [2, 2, 1]-heptene-2 remains solid at room temperature and has a boiling point of 88°C in an atmosphere reduced to 12mm Hg. The exo type is a colorless liquid at room temperature, and has a boiling point of 80.5°C in an atmosphere reduced to 12mm Hg, a density of 1.0065 g/cc at 20°C and a refractive index of 1.4862 with respect to the D line of sodium at 20°C. This invention allows said isomers to be used in a separated or non-separated state. It is possible to use a single or two or more types of the above-mentioned cyano-substituted norbornene derivatives.

The polymers of this invention can be prepared by ring-opening polymerization of the various types of cyano-substituted norbornene derivatives obtained by the above-mentioned process in the presence or absence of an inert organic solvent using a catalytic system consisting of a mixture of organic aluminium compounds and compounds of tungsten and/or those of molybdenum or a catalytic system consisting of said mixture to which there is added at least one compound selected from the group consisting of water, peroxides, epoxides, organic halides, acetal compounds, orthocarbonic acid esters and alcoholic compounds.

The ring-opening polymerization is effected through the following process:

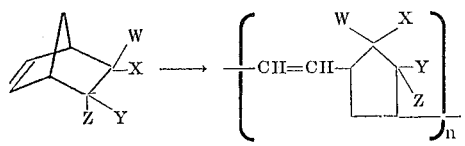

The polymers obtained present different properties from various factors, namely, according as the double bond of the polymer is of the cis or trans type, or depending on the mutual substitution positions and steric positions of the substituents.

Cyano-substituted norbornene derivatives are sometimes likely to polymerize through their c=c double bond according to the following scheme, that is, vinyl polymerization.

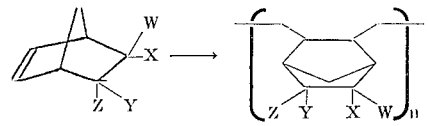

where W, X, Y and Z denote the aforementioned radicals. However, said vinyl polymerization produces polymer with a different chemical structure from the polymers prepared by the method of this invention.

Organic aluminium compounds constituting a part of the catalytic system used in the method of this invention are of the type whose chemical structure may be expressed by the general formula $AlR_3$ or $AlR_n X_{3-n}$ (where R represents the alkyl or aryl radical, X denotes halogens, hydrogen or alkoxy radical and $n$ is 1, 1.5 or 2) or $AlR_3—H_2O$ (where the mol ratio of $H_2O$ to $AlR_3$ has a value of <1.5).

Compounds represented by $AlR_3$, i.e., trialkyl aluminium include trimethyl aluminium, triethyl aluminium, tri-n-propyl aluminium, triisopropyl aluminium, triisobutyl aluminium, trihexyl aluminium and trioctyl aluminium, and triaryl aluminium such as tribenzyl aluminium and triphenyl aluminium.

Compounds denoted by $AlR_2X$ include dialkyl aluminium monohalides such as diethyl aluminium monochloride, di-n-propyl aluminium monochloride, diisobutyl aluminium monochloride, di-n-butyl aluminium monochloride, diethyl aluminium monobromide, and diethyl aluminium monoiodide; dialkyl aluminium monohydrides such as diethyl aluminium monohydride, di-n-propyl aluminium monohydride, and di-isobutyl aluminium monohydride; diaryl aluminium monohalides such as dibenzyl aluminium monochloride, diphenyl aluminium monochloride, dibenzyl aluminium monobromide, and ditolyl aluminium monochloride; and dialkyl aluminium monoalkoxides such as diethyl aluminium monoethoxide, and diisobutyl aluminium monobutoxide.

Compounds indicated by $AlR_{1.5}X_{1.5}$ include ethyl aluminium sesquichloride, ethyl aluminium sesquibromide, and isobutyl aluminium sesquichloride.

Compounds represented by $AlRX_2$ include alkyl aluminium dihalides such as ethyl aluminium dichloride, ethyl aluminium dibromide, propyl aluminium dichloride, isobutyl aluminium dichloride, ethyl aluminium dibromide, and ethyl aluminium diiodide; aryl aluminium dihalides such as benzyl aluminium dichloride, benzyl aluminium dibromide, tolyl aluminium dichloride, and phenyl aluminium dichloride; and alkyl aluminium dialkoxides such as ethyl aluminium diethoxide.

Mixtures denoted by $AlR_3—H_2O$ are mixtures of trialkyl aluminium and water in which the trialkyl aluminium accounts for at least 2 mols based on 3 mols of water. Such mixtures include, for example, mixture of triethyl aluminium and water in which said triethyl aluminium and water should be in the ratio of 1:0.5.

Most preferable among the above-listed organic aluminium compounds are triethyl aluminium, triisobutyl aluminium, trihexyl aluminium, diethyl aluminium monochloride, di-n-butyl aluminium monochloride, ethyl aluminium sesquichloride, diethyl aluminium monobutoxide and a mixture of triethyl aluminium and water in which the triethyl aluminium and water bear the mole ratio of 1:0.5.

Compounds of tungsten and molybdenum partly constituting the catalytic system used in the method of this invention include halides of tungsten and molybdenum such as tungsten hexachloride, tungsten pentachloride, tungsten hexafluoride, tungsten pentafluoride, molybdenum pentachloride, molybdenum hexachloride, molybdenum pentafluoride, molybdenum hexafluoride, molybdenum pentabromochloride and molybdenum pentabromide; oxyhalides of tungsten and molybdenum such as tungsten oxytetrachloride, tungsten oxytetrabromide, tungsten oxydichloride, molybdenum oxytrichloride, and molybdenum oxytetrachloride; in addition, molybdenum dioxydiacetyl acetonate [$MoO_2(CH_3COCH=C(CH_3)O-)_2$; hereinafter referred to as $MoO_2(AcAc)_2$], tungsten hexaalcoholate, tungsten hexaphenolate, tetrachlorotungsten diphenolate, tetrachlorotungsten dialcoholate, dichloromolybdenum dialcoholate, and dichloromolybdenum triphenolate; and compounds, for example, $Al_4W_3Cl_{18}$ obtained by reducing halides of tungsten by powders of aluminium. Most preferable among the above-listed compounds of tungsten and molybdenum are molybdenum pentachloride, tungsten hexachloride, and tungsten oxytetrachloride ($WOCl_4$). The mole ratio of organic aluminium compounds to the compounds of tungsten or molybdenum is generally more than 0.1, preferably more than 0.5. Use of less than 0.1 mol of organic aluminium compounds based on 1 mol of compounds of tungsten or molybdenum failed to attain practical polymerization activity. A catalytic system consisting of 10 mols or organic aluminium compounds based on 1 mol of compounds of tungsten or molybdenum realized an extremely high degree of polymerization activity.

While, according to the method of this invention, the above-mentioned binary catalytic system consisting of organic aluminium compounds and compounds of tungsten or molybdenum can effect the ring-opening polymerization of cyano-substituted norbornene derivatives, addition of a third component to said binary catalytic system to convert it into a ternary system prominently promotes the polymerization activity and further varies the properties of the polymers obtained using said binary catalytic system.

Said third component may be formed of at least one compound selected from the group consisting of water, peroxides, epoxides, organic halides, acetal compounds, alcoholic compounds and orthocarboxylic acid esters. The peroxides include alkyl peroxides such as t-butyl peroxide; aryl peroxides such as benzoyl peroxide; alkyl or aralkyl hydroperoxides such as t-butyl hydroperoxide and cumene hydroperoxide; hydrogen peroxide; per-acids such as peracetic acid; and esters, ketones and aldehydes derived from said peracids. The epoxides include ethylene oxide, propylene oxide, butene-1 oxide, epichlorohydrin, allyl glycidyl ether, and butadiene monoxide. The organic halides include t-butyl hypohalite compounds; allyl halides such as allyl chloride; t-alkyl halides such as t-butyl chloride; halogenated ketones such as $\alpha$-chloroacetone; and halogenated alcohols such as 2-chloroethanol. The acetal compounds include acetaldehyde diethylacetal, diethoxy methane, acetone dimethyl acetal, and dichloroacetaldehyde dimethyl acetal. The alcoholic compounds include methyl alcohol, ethyl alcohol, n-propyl alcohol, n-butyl alcohol, isobutyl alcohol and phenol. Preferable among the orthocarboxylic acid esters are orthoalkyl formate and particularly orthomethyl formate and orthoethyl formate. Water is also an effective third component of the subject catalytic system. While the amount of the third component added varies with its type, its proportion is generally 0.1 to 6 mols, or preferably 0.3 to 3 mols based on 1 mol of compounds of tungsten or molybdenum.

While the amount of the subject catalytic system added to the monomer of cyano-substituted norbornene derivatives varies with the type of said monomer, etc., the compounds of tungsten or molybdenum should generally be added at the rate of 0.001 to 20 mols, or preferably 0.1 to 5 mols based on 100 mols of said monomer. Addition of more than 20 mols of the compounds of tungsten or molybdenum not only results in high cost but also fails to promote the catalytic action, namely, such excess addition does not elevate the degree of polymerization activity. Further, if unduly large amounts of said compounds of tungsten or molybdenum are used, the reaction system will still contain, after completion of the ring-opening polymerization, such amounts of residual tungsten or molybdenum compounds as will be difficult to eliminate. The presence of said catalytic component in the polymer obtained will undesirably color the polymer and give rise to its deterioration when the polymer is later heated for further processing.

As previously mentioned, the object of this invention is attained by the ring-opening polymerization of cyano-substituted norbornene derivatives in the presence or absense of an inert organic solvent. Said inert organic solvent is preferred to be the type which does not harmfully affect the catalytic system. Typical of said solvents are aliphatic hydrocarbons such as pentane, heptane, hexane, petroleum ether and decane; aromatic hydrocarbons such as benzene, toluene and xylene; alicyclic hydrocarbons such as cyclohexane, decalin and cyclooctane; halogenized hydrocarbons such as methylene chloride; 1,2-dichloroethane, 1,2-dichloropropane, chloroform, chlorobenzene and carbon tetrachloride; and ethers such as diethyl ether and tetrahydrofuran. The above-listed inert organic solvents may be used alone or in combination.

The catalytic components, monomer (cyano-substituted norbornene derivatives) and inert organic solvent (if used) may be added in various sequential orders. The typical sequence is to add first the inert organic solvent, secondly the monomer, thirdly the compounds of tungsten or molybdenum, fourthly the third component (if used), and finally organic aluminium compounds. It is also possible to mix the desired compounds among the catalytic components, monomer and solvent or heat them separately before they are used in the ring-opening polymerization.

The object of this invention can be fully attained, as previously described, by the ring-opening polymerization of cyano-substituted norbornene derivatives in the presence of a catalytic system consisting of compounds of tungsten and/or those of molybdenum and organic aluminium compounds or a mixture of said both types of compounds and the aforesaid third component. Yet, the molecular weight of the resultant polymer can be controlled by adding to the polymerization system α-olefins such as ethylene, propylene, butene-1 and hexene-1; internal olefins such as butene-2 and hexene-2; conjugated diolefins such as butadiene and isoprene; or nonconjugated diolefins such as 1,4-hexadiene. In this case, it is generally advised to add 0.01 to 10 parts by weight of said molecular weight controlling agent based on 100 parts by weight of the monomer of cyano-substituted norbornene derivatives.

As previously mentioned, the polymer of this invention can be obtained by the ring-opening polymerization of the subject monomer in the presence of an inert organic solvent or in the absence of said solvent. (bulk polymerization) If used, said inert organic solvent is generally preferred to be added at the rate of 1 to 10 parts by volume based on 1 part volume of the monomer.

The ring-opening polymerization is carried out generally at a temperature ranging from −100°C to +200°C or preferably −40°C to +100°C. At a lower temperature than −100°C, the reaction system does not display desirable polymerization activity with the resultant extremely slow progress of polymerization. In such case, progress of the polymerization consumes a great deal of time, sometimes causing a mixture of the inert organic solvent and monomer to be solidified. Conversely, a higher temperature than 200°C fails to provide a good quality polymer, and is practically undesirable.

The ring-opening polymerization is preferred to take place in an inert atmosphere such as, argon and nitrogen. If oxygen and moisture are present in the reaction system, then the catalytic components, i.e., the organic aluminium compounds and the compounds of tungsten or molybdenum will be changed to obstruct the reproducibility of said polymerization.

The elimination of the catalyst residue and the recovery of the polymer produced after completion of the ring-opening polymerization may be effected by the processes customarily used in the solution polymerization of isoprene and butadiene. Namely, when a solution resulting from the ring-opening polymerization, that is, a solution containing the polymer obtained by said polymerization, the unreacted portion of the monomer and the catalyst residue is poured into lower alcohol, for example, methyl alcohol or ethyl alcohol containing a small amount of hydrochloric acid, then the catalyst residue will be eliminated and the polymer produced will be precipitated at the same time. The object of the elimination of the catalyst residue and the recovery of the polymer can be further achieved by first uniformly diluting the solution resulting from the ring-opening polymerization using solvent immiscible with water, for example, methylene chloride, then by treating said solution with water containing a chelating agent such as nitrilotriacetic acid or ethylene diamine tetraacetic acid to eliminate the catalyst residue and afterwards by recovering the polymer and the organic solvent by the steam stripping process.

The polymer prepared from cyano-substituted derivatives by the aforementioned process is a colorless or faintly yellow transparent resinous material having a Table 1

| | Polymers of this invention | | PP[4] | PVC[5] |
|---|---|---|---|---|
| | Polymer of Example 29 | Polymer of Example 45 | | |
| Izod impact strength[1] (tested by using notched test piece) (kg·cm/cm) | 6.78 | 8.10 | 1.66 | 3.18 |
| Tensile strength[2] (kg/cm$^2$) | 560 | 642 | 356 | 539 |
| Elongation[2] (%) | 110 | 160 | 950 | 240 |
| Hardness[3] (Rockwell R) | 122 | 128 | 92 | 115 |

(measured at 20°C)

reduced viscosity of 0.1 to 20. Data on the impact strength, tensile strength, elongation and hardness of the polymer of 5-cyano-bicyclo [2, 2, 1]-heptene-2 and the polymer of 5-methyl-5-cyanobicyclo [2, 2, 1]-heptene-2 are indicated in Table 1 together with date on the same properties of polyvinyl chloride resin (hereinafter referred to as PVC) and polypropylene resin (hereinafter referred to as PP). As seen from Table 1, the above-mentioned polymers of this invention have higher impact strength and tensile strength than PVC and PP, though displaying a smaller degree of elongation than PVC and PP. The polymers obtained present slightly different properties according to the types of monomer used. The polymers of this invention have a greater surface hardness than PP and PVC. Many of the polymers of the invention have prominent resistance to various organic solvents and oils and also excellent gas barrier property.

Notes:
1. Measured by the method of ASTM D—256—56
A notched test piece specified in ASTM was used. The piece was held in the form of a vertical cantilever fixed at one end, with the notched section disposed on the surface of a support. The free end portion of the test piece was struck at a point 22mm above the support surface from the notched side of the test piece until the piece was cut off. The values of the Izod impact strength are generally indicated in the amount of energy consumed per unit length of the notch.
2. Measured by the method of ASTM D—638—58T
A dumbbell specified in ASTM was prepared. The dumbbell had both ends fitted to a tensile strength testing machine. With the upper end portion of the dumbbell fixed, its lower end portion thereof was forcefully stretched downward at the speed of 5mm per minute until the dumbbell was broken. The tensile strength was expressed by a maximum load applied to give rise to said breakage and the elongation was indicated by a maximum length of said dumbbell stretched until it was broken.

3. Measured by the process of ASTM D—785-51

A test piece specified in ASTM was prepared. The test piece was placed on a testing machine and first had its surface subjected to a small load of 10 kg through a steel ball one-half inch in diameter, and with the zero scale adjusted, further had said surface subjected to a great load of 60 kg, for 15 seconds through said steel ball. The hardness of the test piece was expressed by readings on the scale of the testing machine after 15 seconds from release of the great load.

4. Manufactured by Showa Yuka Co., Ltd. under the trademark "Shoallomer"

5. Manufactured by Kureha Chemical Industry Co., Ltd. under the trademark "Kureha S901"

The polymer of this invention whose molecules bear reactive double bonds not only enables other monomers such as styrene, acrylonitrile and methyl methacrylate to be graft-copolymerized with said polymer, but also can be formed into a thermosetting resin by applying heat in the presence or absence of a cross-linking agent such as an organic peroxide in said polymer. Further, the polymer of this invention which has a nature to decompose itself upon exposure to sunlight can be used as the so-called photodegradation type.

While the polymer of this invention prepared from cyano-substituted norbornene derivatives may be used alone, it can be applied in a form blended with synthetic resins such as PVC, acrylonitrile-butadiene-styrene resin (ABS resin) and methyl methacrylate resin or with elastomers such as acrylonitrile-butadiene rubber (NBR) and polychloroprene rubber. Further depending on the applications, the polymer of this invention may be mixed with additives such as stabilizers against light (ultraviolet rays), heat, oxygen and ozone, flame retardants, plasticizers, reinforcing agents, fillers, coloring agents, antistatic agents and decomposition accelerators to display a more prominent effect.

The polymer of this invention, whether alone, or in a form mixed with the above-listed resins or additives, can be molded into a variety of shaped articles by the compression molding, extrusion molding, injection molding, blow molding and casting which are generally applied in manufacturing resin products.

The polymer of this invention can be used in wide fields by being molded into various forms with its aforesaid advantages drown upon. For example, the polymer may be fabricated into vessels like bottles, films and secondary processed goods thereof such as bags, packing materials, daily sundry goods, and parts of machines and electric appliances including illumination apparatuses. Further, the present polymer decomposes itself when exposed to sunlight (ultraviolet rays). Accordingly, if the film or vessel prepared from said polymer which contains goods or foods is exposed to sunlight for a certain length of time after being emptied of its contents, then it will be easily disposed of as rubbish. Unlike general resins, for example, PP or PVC, therefore, the polymer of this invention has the advantage of eliminating any troublesome dumping work such as burning after moldings of said general resins, for example, films or vessels have fulfilled application.

However, addition of an ultraviolet ray absorber, for example, "Tynuvin 327" (Manufactured by Musashino Geigy Co., Ltd.) enables the polymer of this invention to display prominent weatherability or resistance to ultraviolet rays. When mixed with said ultraviolet ray absorber, moldings of said polymer can be used even outdoors under a stable condition.

Moreover, moldings of the present polymer have sufficiently high antigas permeability to be used as a vessel of soft drinks or general foods. When properly foamed, said polymer can be formed into a cushioning material or heat insulator. In addition, said polymer can be fabricated into a gasoline container due to its high oil resistance and as surface coatings or various articles due to its great hardness.

Table 2

| Time of weatherability test[1] (hours) | Reduced viscosity[2] of polymer (Example 30) |
|---|---|
| 0 | 0.58 |
| 20 | 0.34 |
| 60 | 0.25 |
| 280 | 0.10 |

Note:
1. Tested at 63°C according to the method of the Japanese Industrial Standards (JIS) A·1411–1968 on a sample of film 0.13mm thick, using the Standard Sunshine Weather Meter manufactured by Toyo Rika Industries Inc. with the spray cycle set at 12 min./60 min.
2. Measured at 30°C in a solvent of dimethyl formamide with the concentration of the polymer fixed at 0.1 g/dl.

This invention will be more fully understood by reference to the examples which follow. Throughout the examples, the reduced viscosity $\eta_{sp}/C$ of the polymer was measured at 30°C in a solvent of dimethylformamide with the concentration of the polymer fixed at 0.1 g/dl. The Vicat softening point was determined by ASTM D—1043-51 in the following manner. Namely, there were prepared test pieces 3mm thick and 30mm long and wide. A needle whose forward end portion consisted of a rod 1mm$^2$ in cross section was erected upright on the test piece. A load of 1000 g was applied to the test piece through said needle with temperature raised at the rate of 50°C per hour. The Vicat softening point was expressed by the temperature at which the rod-like end portion of the needle was inserted 1mm into the test piece.

EXAMPLE 1

Under nitrogen atmosphere, a dry flask was filled with 100 parts by volume of a monomer of 5-cyano bicyclo [2, 2, 1]-heptene-2 (containing 53 percent of the endo type) subjected to vacuum distillation before use and 200 parts by volume of toluene and 3 mol percent of tungsten hexachloride based on the amount of said monomer. After ice cooled, the mass was mixed with 9 mol percent of diethyl aluminium monochloride based on the amount of said monomer. Polymerization was commenced at 15°C. 30 minutes later, the reaction system was solidified. After polymerization continued 19 hours, there was added as a stabilizer 0.5 percent by weight of bis (2-hydroxy-3-t-butyl-5-methyl phenyl) methane. The reaction product including a solvent was poured into 2,000 parts by volume of methyl alcohol containing 5 percent by volume of concentrated hydrochloric acid to precipitate the polymer obtained. After separated, the precipitated polymer was well washed with methyl alcohol and mixed with 0.5 percent by weight of the aforesaid stabilizer and vacuum dried at 50°C overnight, providing a grayish yellow polymer. The conversion of the monomer was 33.9 percent. The polymer thus produced was dissolved in tetrahydrofuran. (The amount of tetrahydrofuran is about 10-fold based on the amount of said polymer.) Refining was carried out by the reverse precipitation process using as a precipitant the methyl alcohol which contained 5 percent by volume of hydrochloric acid and 0.5 percent by weight of the aforesaid stabilizer. Said refining was repeated four times, obtaining a minutely yellow transparent polymer whose reduced viscosity $\eta_{sp}/C$ was 0.21.

EXAMPLE 2

Polymerization was effected in the same manner as in Example 1 excepting that the tungsten hexachloride of Example 1 was replaced by molybdenum pentachloride and that polymerization was carried out at 40°C for 20 hours. As the result, a brown soft polymer was produced, the conversion being 21.4 percent. This polymer was insoluble in methylene chloride and tetrahydrofuran.

EXAMPLE 3

Polymerization was carried out in the same manner as in Example 1 excepting that the tungsten hexachloride of Example 1 was replaced by tungsten hexaphenolate [$W(OC_6H_5)_6$], and that polymerization was conducted at 40°C for 20 hours. As the result, a dark yellow polymer was obtained, the conversion being 14.3 percent. After subjected to the same after-treatment and refining as in Example 1, the polymer became faintly yellow.

EXAMPLE 4

Polymerization was performed in the same manner as in Example 1, excepting that the tungsten hexachloride was substituted by molybdenum dioxydiacetyll acetonato [$MoO_2(AcAc)_2$], and that 100 parts by volume of toluene were used. As the result, brown powders of polymer were obtained, the conversion being 7.0 percent. After subjected to the same after treatment and refining as in Example 1, the polymer became transparent and minutely yellow, and indicated a reduced viscosity $\eta_{sp}/C$ of 0.21.

EXAMPLE 5

Polymerization was carried out in the same manner as in Example 4, excepting that there was applied a temperature of 60°C. Brown powders of polymer were produced, the conversion being 48.2 percent. After subjected to the same after treatment and refining as in Example 1, the polymer was transparent and minutely yellow and indicated a reduced viscosity $\eta_{sp}/C$ of 0.16.

EXAMPLE 6

Polymerization was effected in the same manner as in Example 1, excepting that there was used a compound $Al_4W_3Cl_{18}$ obtained by reducing tungsten hexachloride with aluminium powders and that 100 parts by volume of toluene were applied. As the result, a greenish yellow polymer was produced, the conversion being 23.2 percent. After subjected to the same after treatment and refining as in Example 1, the polymer became transparent and minutely yellow.

EXAMPLES 7 TO 12

Polymerization was performed in the same manner as in Example 1, excepting that organic aluminium compounds shown in Table 3 below were used and that toluene was added in the proportions shown therein. The polymer obtained was subjected to the same after treatment and refining as in Example 1. The conversion of the monomer, the properties of the crude and refined polymers and the reduced viscosity $\eta_{sp}/C$ of the refined polymer were all measured, the results being presented in Table 3 below.

Table 3

| Items \ Examples | 7 | 8 | 9 |
|---|---|---|---|
| Organic aluminum compounds | Triethyl aluminium | Diethyl aluminum monochloride(1) | Triethyl aluminium -water (1:0.5) |
| Parts by volume of toluene | 100 | 100 | 100 |
| Conversion (%) | 9.8 | 41.8 | 43.1 |
| Properties of the crude polymer | Dark brown powders | Grayish yellow powders | Yellow |
| Properties of the refined polymer including the reduced viscosity ($\eta_{sp}/C$) | Minutely yellow, transparent, with 0.25 $\eta_{sp}/C$ | Minutely yellow, transparent, with 0.18 $\eta_{sp}/C$ | Minutely yellow, transparent, with 0.42 $\eta_{sp}/C$ |

| Items \ Examples | 10 | 11 | 12 |
|---|---|---|---|
| Organic aluminium compounds | Diethyl aluminium ethoxide | Diethyl aluminium monohydride | Ethyl aluminium sesquichloride |

Table 3 —Continued

| Items \ Examples | 10 | 11 | 12 |
|---|---|---|---|
| Parts by volume of toluene | 100 | 100 | 100 |
| Conversion (%) | 37.5 | 6.2 | 29.3 |
| Properties of the crude polymer | Dark green | Dark brown powders | Brown |
| Properties of the refined polymer including the reduced viscosity ($\eta_{sp}/C$) | Minutely yellow, transparent, with 0.48 $\eta_{sp}$C | Minutely yellow, transparent, with 0.18 $\eta_{sp}/C$ | Minutely yellow, transparent |

Note:
(1) The same as in Example 1

EXAMPLE 13

Polymerization was carried out in the same manner as in Example 1, excepting that diethyl aluminium monochloride of Example 1 was replaced by ethyl aluminium dichloride, 100 parts by volume of toluene were used and a temperature of 60°C was applied. As the result, a dark brown polymer was produced, the conversion being 8.3 percent. This polymer was insoluble in a solvent of dimethyl formamide.

EXAMPLE 14

Polymerization was effected in the same manner as in Example 8, excepting that said polymerization was continued 20 hours. There were obtained grayish yellow powders of polymer, the conversion being 19.8 percent.

EXAMPLE 15

Under nitrogen atmosphere, a dry flask was filled with 100 parts by volume of a monomer of 5-cyano-5-methyl bicyclo [2, 2, 1]-heptene-2 (containing 60 percent of the endo type) subjected to vacuum distillation before use, 200 parts by volume of toluene and 2 mol percent of tungsten hexachloride based on the amount of said monomer. After ice cooled, the mass was mixed with 6 mol percent of diethyl aluminium monochloride based on the amount of said monomer. Ring-opening polymerization was commenced at 15°C. 30 minutes later, the reaction system was solidified. Said polymerization was continued 19 hours. There was added as a stabilizer, 0.5 percent by weight of bis (2-hydroxy-3-t-butyl-5-methyl phenyl) methane. The reaction product including the solvent was powdered in 2,000 parts by volume of methyl alcohol containing 5 percent by volume of concentrated hydrochloric acid to precipitate the polymer produced. After separated, the precipitated polymer was well washed with methyl alcohol. To the polymer was added 0.5 percent by weight of the aforesaid stabilizer. The mass was vacuum dried at 50°C overnight. As the result, a greenish yellow polymer was obtained, the conversion being 24.7 percent. The polymer thus produced was dissolved in tetrahydrofuran. (The amount of tetrahydrofuran is about 10-fold based on the amount of said polymer). Refining was carried out four times by the reverse precipitation process, using as a precipitant the methyl alcohol which contained 5 percent by volume of hydrochloric acid and 0.5 percent by weight of the aforesaid stabilizer. As the result, a minutely yellow transparent polymer was obtained, the reduced viscosity $\eta_{sp}/C$ of said polymer being 0.43.

EXAMPLES 16 TO 20

Ring-opening polymerization was carried out in the same manner as in Example 15, excepting that there were used compounds of tungsten or molybdenum shown in Table 4 below, said polymerization was effected at the temperature and for the length of time indicated therein and there were added the parts by volume of toluene also shown therein. The polymer produced was subjected to the same after treatment and refining as in Example 1. The conversion of the monomer, the properties of the crude and refined polymers and the reduced viscosity $\eta_{sp}/C$ of the refined polymer were all measured, the results being set forth in Table 4 below.

Table 4

| Items \ Examples | 16 | 17 | 18 |
|---|---|---|---|
| Compounds of tungsten or molybdenum | Molybdenum pentachloride | Tungsten hexaphenolate | Molybdenum dioxy diacetyl acetonato |
| Polymerization temperature (°C) | 40 | 40 | 15[1] |
| Polymerization time (hrs) | 20 | 20 | 19[2] |
| Parts by volume of toluene | 200[3] | 200[3] | 100 |
| Conversion (%) | 14.1 | 14.1 | 7.0 |
| Properties of the crude polymer | Brown and soft with a | Dark yellow | Brown |

Table 4 —Continued

| Items \ Examples | 16 | 17 | 18 |
|---|---|---|---|
| including the reduced viscosity ($\eta_{sp}/C$) | reduced viscosity $\eta_{sp}/C$ of 0.29 | | |
| Properties of the refined polymer including the reduced viscosity ($\eta_{sp}/C$) | — | Faintly yellow, with 0.35 $\eta_{sp}/C$ | Minutely yellow, transparent, with 0.26 $\eta_{sp}/C$ |

| Items \ Examples | 19 | 20 |
|---|---|---|
| Compounds of tungsten or molybdenum | Molybdenum dioxy diacetyl acetonato | $Al_4W_3Cl_{18}$ |
| Polymerization temperature (°C) | 60 | 15[1] |
| Polymerization time (hrs) | 19[2] | 19[2] |
| Parts by volume of toluene | 100 | 100 |
| Conversion (%) | 48.2 | — |
| Properties of the crude polymer including the reduced viscosity ($\eta_{sp}/C$) | Brown | Greenish yellow |
| Properties of the refined polymer including the reduced | Minutely yellow, transparent, with 0.21 $\eta_{sp}/C$ | Minutely yellow, transparent, with 0.33 $\eta_{sp}/C$ |

Notes:
[1] The same temperature as in Example 15
[2] The same length of time as in Example 15
[3] The same volumes as in Example 15

EXAMPLES 21 TO 28

Ring-opening polymerization was effected in the same manner as in Example 15 excepting that the organic aluminium compounds listed in Table 5 below were used, said polymerization was conducted at the temperature and for the length of time indicated therein and toluene was added in the proportions similarly shown therein. The polymer obtained was subjected to the same after treatment and refining as in Example 1.

Measurement was made of the conversion rate of the monomer, the properties of the crude and refined polymers and the reduced viscosity $\eta_{sp}/C$ of the refined polymer, the results being presented in Table 5 below.

Table 5

| Items \ Examples | 21 | 22 | 23 | 24 |
|---|---|---|---|---|
| Organic aluminium compounds | Triethyl aluminium | Diethyl aluminium monochloride | Triethyl aluminium -water (1:0.5) | Diethyl aluminium ethoxide |
| Polymerization temperature (°C) | 15[2] | 15[2] | 15[2] | 15[2] |
| Polymerization time (hrs) | 19[3] | 19[3] | 19[3] | 19[3] |
| Parts by volume of toluene | 100 | 100 | 100 | 100 |
| Conversion (%) | 11.4 | 36.7 | 39.5 | 29.1 |
| Properties of the crude polymer | Dark brown | Greenish yellow powders | Dark yellow powders | Dark green |
| Properties of the refined polymer including the reduced viscosity ($\eta_{sp}/C$) | Minutely yellow, transparent, with 0.34 $\eta_{sp}/C$ | Minutely yellow, transparent, with 0.24 $\eta_{sp}/C$ | Minutely yellow, transparent, with 0.53 $\eta_{sp}/C$ | Minutely yellow, transparent, with 0.46 $\eta_{sp}/C$ |
| Organic aluminium compounds | Diethyl aluminium monohydride | Ethyl aluminium dichloride | Ethyl aluminium sesquichloride | Diethyl aluminium monochloride[1] |
| Polymarization temperature (°C) | 15[2] | 60 | 15[2] | 15[2] |
| Polymerization time (hrs) | 19[3] | 19[3] | 19[3] | 4 |
| Parts by volume of toluene | 100 | 100 | 100 | 100 |

Table 5 — Continued

| Examples Items | 25 | 26 | 27 | 28 |
|---|---|---|---|---|
| Conversion (%) | 4.7 | 4.1 | 30.1 | 16.5 |
| Properties of the crude polymer | Dark brown powders | Dark brown[4] | Dark green | Greenish yellow powders |
| Properties of the refined polymer including the reduced viscosity ($\eta_{sp}C$) | Minutely yellow, transparent, with 0.22 $\eta_{sp}/C$ | — | Minutely yellow, transparent, with 0.40 $\eta_{sp}/C$ | Minutely yellow, transparent, with 0.49 $\eta_{sp}/C$ |

Notes:
[1] the same as in Example 15
[2] the same polymerization temperature as in Example 15
[3] the same polymerization time as in Example 15
[4] partly insoluble in a solvent of dimethyl formamide

EXAMPLE 29

Polymerization was carried out in the same manner as in Example 1, excepting that the tungsten hexachloride and diethyl aluminium monochloride of Example 1 were used in the proportions of 1 mol percent and 3 mol percent respectively based on the amount of the monomer and there was added as a third component 1 mol of benzoyl peroxide based on 1 mol of the tungsten hexachloride. As the result, a dark green polymer was produced, the conversion being 56.8 percent. After subjected to the same after treatment and refining as in Example 1, the polymer became minutely yellow and transparent and presented a reduced viscosity $\eta_{sp}/C$ of 0.95. The nuclear magnetic resonance spectrum of the polymer was given in FIG. 1. Said spectrum resembles that of a polymer obtained by the ring-opening polymerization of norbornene, and may be divided into two sections (refer to a joint report by Francis W. Michelotti and William P. Keaveneg appearing in the Journal of Polymer Science, part A, Vol. III, P. 900, 1965.) Said two sections are represented by $\tau=9.0$ to 6.5 (A) and $\rho=5.0$ to 4.0 (B). The former denotes proton attached to saturated carbon and the latter olefin proton. The polymerization of the cyano-substituted norbornene derivatives of this invention may be effected by the ring-opening type or the vinylene type. The ratio of the area of the section B to the area of the section A is 2/7 for the ring-opening type and 0/9 for the vinylene type. As calculated from FIG. 1, the ratio of the area of B to the area of A is 2.0 to 7.3, proving 100 percent ring-opening type within the range of experimental errors.

Figure 2:
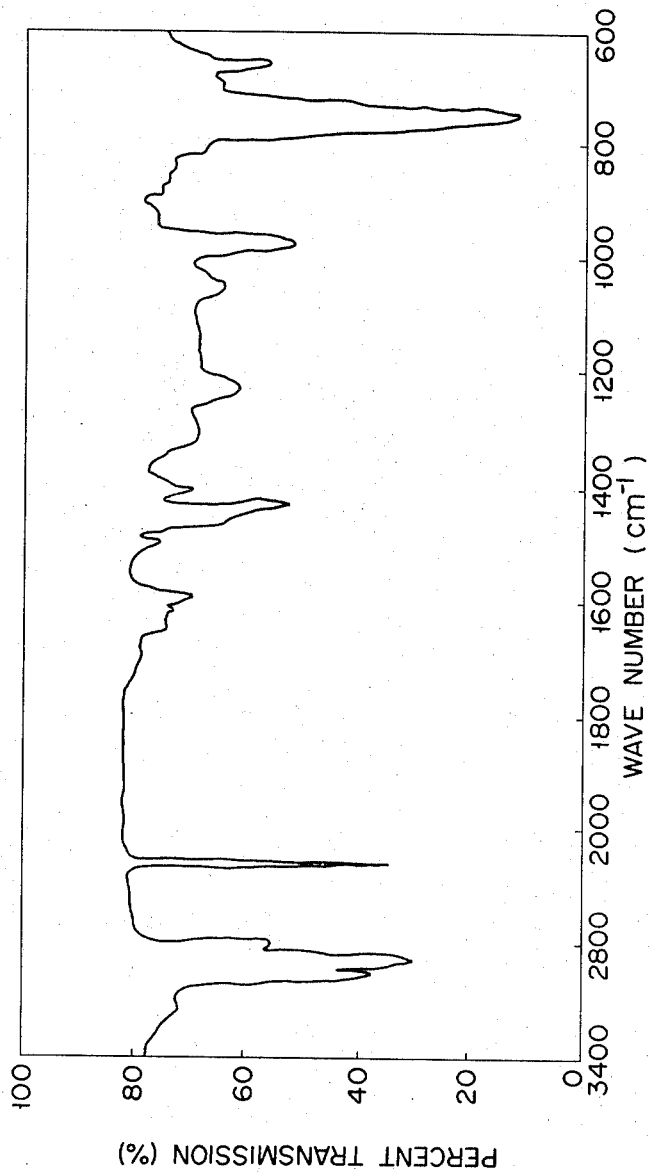
FIG. 2 is a diagram of the infrared absorption spectrum of the polymer of the invention obtained in said Example 29.

FIG. 2 presents the infrared absorption spectrum of a polymer obtained in Example 29. Referring to said figure, 750 cm$^{-1}$ represents the absorption of infrared rays by the cis-double bond and 960 cm$^{-1}$ denotes absorption by the trans-double bond. The ratio of $D_{750}/D_{960}$ (where $D_{750}$ indicates the absorbance by the cis-double bond and $D_{960}$ the absorbance by the trans-double bond) may be taken as a guide in estimating whether the polymer of this invention contains the cis-double bond or trans-double bond in a larger proportion. With the polymer obtained in Example 29, the value of the ratio $D_{750}/D_{960}$ was 7.0. From this fact, the polymer of Example 29 may be assumed to the type containing the larger amount of the cis-double bond. At a temperature of 40°C, said polymer was soluble in dimethyl formamide, dimethyl sulfoxide, acetone, tetrahydrofuran, chloroform and methylene chloride, but insoluble in petroleum ethers, toluene, methyl acetate and carbon tetrachloride.

The polymer of Example 29 could be molded into soft transparent film by pressing at a temperature of 140°C and a pressure of 50 kg/cm$^2$. The transparent film could also be prepared by the solvent casting process. In either case, the film had a great surface hardness. One of the characteristics of said polymer was that the main chain of the polymeric structure contained reactive double bonds. Accordingly, the polymer could be hardened by heating or being treated with a hardening agent such as organic peroxides. For example, when heated 30 minutes in an atmosphere of nitrogen at 160°C, the polymer became insoluble and nonfusible.

Further, the dynamic viscoelasticity of the polymer of Example 29 was measured by a viscoelasticity tester (manufactured by Toyo Meausuring Instruments Co., Ltd. under the trademark "Vibron Model DDV-II"). This test showed that the polymer indicated a glass transition temperature of 96°C, and was also subjected to secondary dispersion at −104°C and +15°C. The polymer had the impact strength, tensile strength, elongation and hardness (Rockwell R) as in Table 1.

EXAMPLE 30

Ring-opening polymerization was carried out in the same manner as in Example 29, excepting that benzoyl peroxide of Example 29 was replaced by 1 mol of t-butyl peroxide based on 1 mol of tungsten hexachloride. A dark green polymer was obtained, the conversion being 39.4 percent. After subjected to the same after treatment and refining as in Example 1, the polymer became minutely yellow and transparent and indicated a reduced viscosity $\eta_{sp}/C$ of 0.58. A weatherability test was conducted on samples prepared from the polymer, the results being presented in the previously shown Table 2.

EXAMPLES 31 TO 39

Ring-opening polymerization was effected in the same manner as in Example 29, excepting that the benzoyl peroxide of Example 29 was replaced by 2 mols (1 mol in Examples 31 and 39) of the third component shown in Table 6 below based on 1 mol of the tungsten hexachloride. The polymer produced was subjected to the same after treatment and refining as in Example 1. Measurement was made of the conversion rate of the monomer, the properties of the crude and refined polymers and the reduced viscosity $\eta_{sp}/C$ of the refined polymer, the results being set forth in Table 6 below.

Table 6

| Examples Items | 31 | 32 | 33 |
|---|---|---|---|
| Kind of a third component | t-butyl chloride | Ethylene chlorohydrine | α-chloroacetone |
| Conversion (%) | 57.4 | 44.3 | 74.5 |
| Properties of the crude polymer | Dark green[1] | Dark green | Dark green |
| Properties of the refined polymer including the reduced viscosity $\eta_{sp}/C$ | — | Minutely yellow, transparent, with 0.96 $\eta_{sp}/C$ | Minutely yellow, transparent, with 0.60 $\eta_{sp}/C$ |

| Examples Items | 34 | 35 | 36 |
|---|---|---|---|
| Kind of a third component | Acetaldehyde diethyl acetal | Orthoethyl formate | Epichlorohydrine |
| Conversion (%) | 78.3 | 66.2 | 61.7 |
| Properties of the crude polymer | Dark green | Dark green[1] | Dark green |
| Properties of the refined polymer including the reduced viscosity $\eta_{sp}/C$ | Minutely yellow, transparent, with 3.10 $\eta_{sp}/C$ | — | Minutely yellow, transparent, with 0.58 $\eta_{sp}/C$ |

| Examples Items | 37 | 38 | 39 |
|---|---|---|---|
| Kind of a third component | Propylene oxide | n-butyl alcohol | Water |
| Conversion (%) | 58.9 | 62.4 | 85.1 |
| Properties of the crude polymer | Dark green | Dark green | Greenish Yellow |
| Properties of the refined polymer including the reduced viscosity $\eta_{sp}/C$ | Minutely yellow, transparent, with 0.93 $\eta_{sp}/C$ | Minutely yellow, transparent, with 1.11 $\eta_{sp}/C$ | Colorless, transparent with 0.83 $\eta_{sp}/C$ |

Note:
[1] The polymer was insoluble in methylene chloride and tetrahydrofuran.

EXAMPLES 40 TO 42

Ring-opening polymerization was conducted in the same manner as in Example 29, excepting that there was added the mol percent of diethyl aluminium monochloride given in Table 7 below based on the amount of the monomer. The polymer obtained was subjected to the same after treatment and refining as in Example 1. Measurement was made of the conversion of the monomer and the properties of the crude and refined polymers, the results being presented in Table 7 below.

Table 7

| Examples Items | 40 | 41 | 42 |
|---|---|---|---|
| Mol % of diethyl aluminium monochloride based on the amount of the monomer | 2.0 | 6.0 | 10.0 |
| Conversion (%) | 36.2 | 71.6 | 80.9 |
| Properties of the crude polymer | Dark green | Dark green | Dark green[1] |
| Properties of the refined polymer | Minutely yellow, transparent | Minutely yellow, transparent | — |

Note:
[1] The polymer was partly insoluble in tetrafuran and methylene chloride.

EXAMPLES 43 AND 44

Ring-opening polymerization was performed in the same manner as in Example 29, excepting that benzoyl peroxide was used in the molar amount shown in Table 8 below based on 1 mol of the tungsten hexachloride. The polymer prepared was subjected to the same after treatment and refining as in Example 1. Measurement was made of the conversion of the monomer, the properties of the crude and refined polymers and the reduced viscosity $\eta_{sp}/C$ of the refined polymer, the results being presented in Table 8 below.

Table 8

| Examples Items | 43 | 44 |
|---|---|---|
| Mol amount of benzoyl peroxide | 0.3 | 4.0 |
| Conversion (%) | 49.0 | 86.7 |
| Properties of the crude polymer | Dark green | Dark green |
| Properties of the refined polymer including the reduced viscosity $\eta_{sp}/C$ | Minutely yellow, transparent[1] | Minutely yellow, transparent, with 0.46 $\eta_{sp}/C$ |

Note:
[1] The polymer was partly insoluble in tetrahydrofuran and methylene chloride.

EXAMPLE 45

Ring-opening polymerization was carried out in the same manner as in Example 29, excepting that 5-cyano-5-methyl bicyclo [2, 2, 1]-heptene-2 (containing 60 percent of the endo type) was used as a monomer and 0.7 mol percent of tungsten hexachloride and 2.1 mol percent of diethyl aluminium monochloride were added based on the amount of said monomer. The polymer subjected to the same after treatment as in Example 1 presented dark green. The conversion of the monomer was 48.8 percent. After refined in the same manner as in Example 1, the polymer became minutely yellow and transparent and indicated a reduced viscosity $\eta_{sp}/C$ of 0.77.

Figure 3:
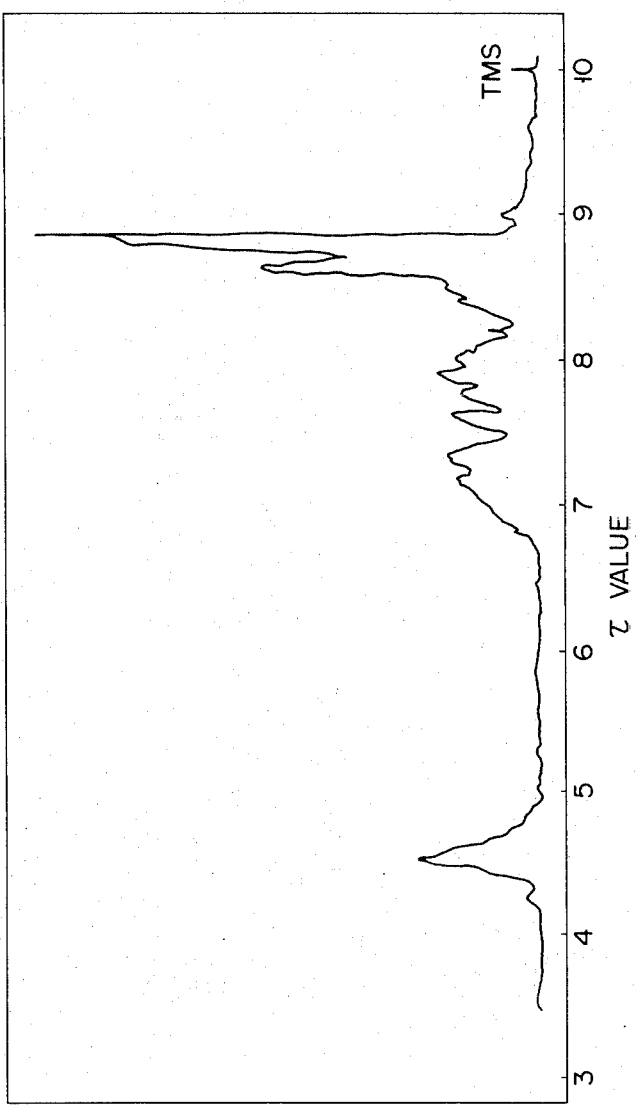
FIG. 3 is a diagram of the nuclear magnetic resonance spectrum of the polymer of the invention obtained in Example 45.

The polymer showed a nuclear magnetic resonance spectrum illustrated in FIG. 3. As in Example 29, this spectrum resembles that of a polymer obtained by the ring-opening polymerization of norbornene and may be divided into two sections A and B. The area ratio of the two sections B and A calculated from FIG. 3 was 2.0:9.1, proving that the polymer of Example 45 was of 100 percent ring-opening type within the range of experimental errors.

Figure 4:
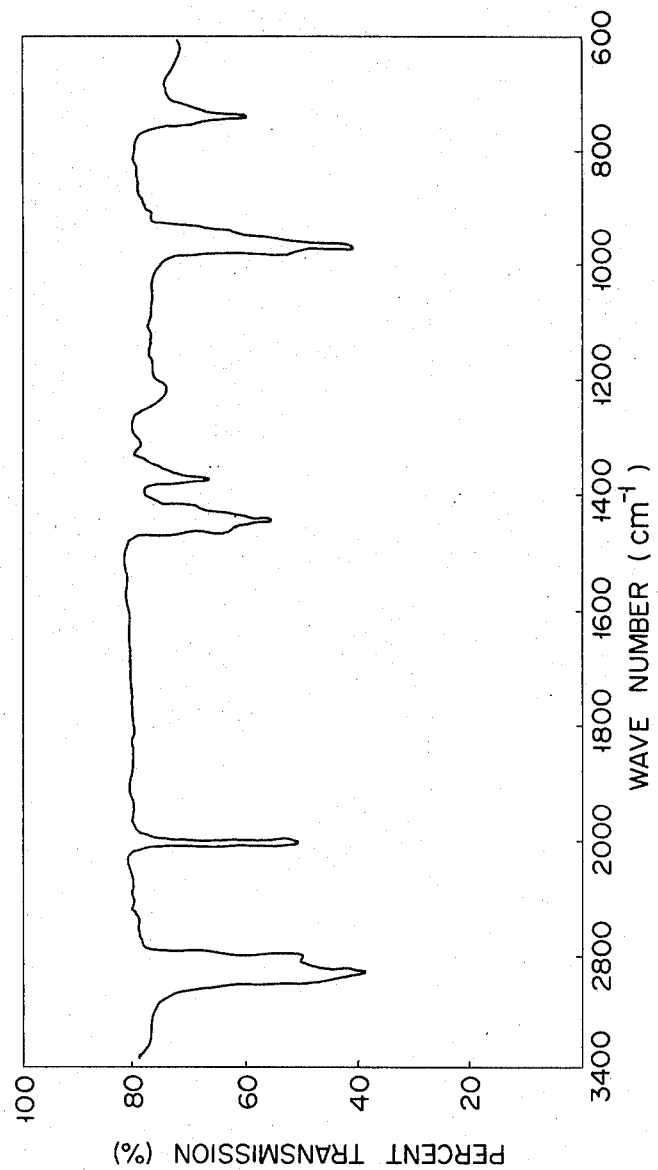
FIG. 4 is a diagram of the infrared absorption spectrum of the polymer of the invention obtained in said Example 45.

The polymer showed an infrared absorption spectrum illustrated in FIG. 4. The value of the ratio $D_{750}/D_{960}$ of said polymer was 1.6.

At a temperature of 40°C, the polymer was soluble in dimethyl formamide, dimethyl sufoxide, acetone, tetrahydrofuran, chloroform, methylene chloride, toluene and methyl acetate, but insoluble in petroleum ethers and carbon tetrachloride.

Further, the polymer could be molded into soft transparent film by pressing at a temperature of above 160°C and a pressure of 50 kg/cm². The film could also be prepared by the solvent casting process. Said film had a great surface hardness. Like the polymer of Example 29, the polymer of Example 45 was hardened by heating or being treated with a hardening agent. For example, when heated 30 minutes at 160°C in an atmosphere of nitrogen, the polymer became insoluble and nonfusible.

The polymer had the vicat softening paint of 130°C (as measured by ASTM D—1043-51) and izod impact strength, tensile strength, elongation and hardness (Rockwell R) as shown in the previously given Table 1.

EXAMPLES 46 TO 55

Ring-opening polymerization was carried out in the same manner as in Example 45, excepting that the benzoyl peroxide of Example 45 was replaced by 2 mols (1 mol in Examples 46, 47 and 55) of the third component shown in Table 9 below based on 1 mol of the tungsten hexachloride. The polymer produced was subjected to the same after treatment and refining as in Example 1. Measurement was made of the conversion of the monomer, the properties of the crude and refined polymers and the reduced viscosity $\eta_{sp}/C$ of the refined polymer, the results being set forth in Table 9 below.

Table 9

| Items \ Examples | 46 | 47 | 48 | 49 |
|---|---|---|---|---|
| Kind of the third component | t-butyl peroxide | t-butyl chloride | Ethylene chlorohydrine | α-chloroacetone |
| Conversion (%) | 35.3 | 50.8 | 40.9 | 63.4 |
| Properties of the crude polymer | Dark green | Dark green | Dark green | Dark green |
| Properties of the refined polymer including the reduced viscosity $\eta_{sp}/C$ | Minutely yellow, transparent, with 0.74 $\eta_{sp}/C$ | Minutely yellow, transparent[1] | Minutely yellow, transparent, with 3.21 $\eta_{sp}/C$ | Minutely yellow, transparent, with 0.63 $\eta_{sp}/C$ |

| Items \ Examples | 50 | 51 | 52 |
|---|---|---|---|
| Kind of the third component | Acetadehyde diethyl acetal | Orthoethyl fomate | Epichlorohydrine |
| Conversion (%) | 80.1 | 60.3 | 42.5 |
| Properties of the crude polymer | Dark green | Dark green | Dark green |
| Properties of the refined polymer including the reduced viscosity $\eta_{sp}/C$ | Minutely yellow, transparent, with 3.43 $\eta_{sp}/C$ | Minutely yellow, transparent,[1] with 0.31 $\eta_{sp}/C$[2] | Minutely yellow, transparent, with 0.79 $\eta_{sp}/C$ |

| Items \ Examples | 53 | 54 | 55 |
|---|---|---|---|
| Kind of the third component | Propylene oxide | n-butyl alcohol | Water |
| Conversion (%) | 42.9 | 61.7 | 70.5 |
| Properties of the crude polymer | Dark green | Dark greenish yellow | Greenish yellow |
| Properties of the refined polymer including the reduced viscosity $\eta_{sp}/C$ | Minutely yellow, transparent, with 1.0 $\eta_{sp}/C$ | Minutely yellow, transparent, with 1.34 $\eta_{sp}/C$ | Colorless, transparent with 0.91 $\eta_{sp}/C$ |

Notes:
[1] The polymer contains gel.
[2] Represents the reduced viscosity $\eta_{sp}/C$ of the soluble portion of the polymer.

EXAMPLES 56 TO 58

Ring-opening polymerization was effected in the same manner as in Example 45, excepting that diethyl aluminium monochloride was used in the mol percent shown in Table 10 below based on the amount of the monomer. The polymer obtained was subjected to the same after-treatment and refining as in Example 1. Measurement was made of the conversion of the monomer, the properties of the crude and refined polymers and the reduced viscosity $\eta_{sp}/C$ of the refined polymer, the results being set forth in Table 10 below.

Table 10

| Examples<br>Items | 56 | 57 | 58 |
|---|---|---|---|
| Mol % of diethyl aluminium monochloride based on the amount of the monomer | 1.4 | 6.0 | 10.0 |
| Conversion (%) | 31.3 | 53.1 | 54.4 |
| Properties of the crude polymer | Greenish yellow | Dark green | Dark green |
| Properties of the refined polymer including the reduced viscosity $\eta_{sp}/C$ | Minutely yellow, transparent, with 0.64 $\eta_{sp}/C$ | Minutely yellow, transparent, with 0.72 $\eta_{sp}/C$ | Minutely yellow, transparent, with 0.48 $\eta_{sp}/C$ |

EXAMPLES 59 AND 60

Ring-opening polymerization was conducted in the same manner as in Example 45, excepting that benzoyl peroxide was used in the mol amount shown in Table 11 below based on 1 mol of the tungsten hexachloride. The polymer prepared was subjected to the same after treatment and refining as in Example 1. Measurement was made of the conversion rate of the monomer, the properties of the crude and refined polymers and the reduced viscosity $\eta_{sp}/C$ of the refined polymer, the results being presented in Table 11 below.

Table 11

| Examples<br>Items | 59 | 60 |
|---|---|---|
| Mol amount of benzoyl peroxide | 0.3 | 4.0 |
| Conversion (%) | 48.9 | 71.8 |
| Properties of the crude polymer | Dark green | Dark green |
| Properties of the refined polymer including the reduced viscosity $\eta_{sp}/C$ | Minutely yellow, transparent, with 0.83 $\eta_{sp}/C$ | Minutely yellow, transparent, with 0.53 $\eta_{sp}/C$ |

EXAMPLE 61

Under nitrogen atmosphere, a dry flask was filled with 100 parts by volume of a monomer of 5-cyano bicyclo [2, 2, 1]-heptene-2, 200 parts by volume of toluene and 0.8 mol percent of tungsten hexachloride based on the amount of the monomer. After ice cooled, the mass was mixed with 3.0 mol of diethyl aluminium monochloride based on 1 mol of the tungsten hexachloride and 1 mol of benzoyl peroxide based on 1 mol of said tungsten hexachloride. Polymerization was continued 19 hours at 15°C. When subjected to the same after treatment as in Example 1, the crude polymer obtained indicated a dark green color, the conversion being 43.0 percent. After further refined in the same manner as in Example 1, the crude polymer became minutely yellow and transparent and indicated a reduced viscosity $\eta_{sp}/C$ of 1.92.

EXAMPLES 62 TO 64

Ring-opening polymerization was carried out in the same manner as in Example 61, excepting that there was added to the reaction system a molecular weight controlling agent in the mol percent shown in Table 12 below. The polymer produced was subjected to the same after treatment and refining as in Example 1. Measurement was made of the conversion rate of the monomer, the properties of teh crude and refined polymers and the reduced viscosity $\eta_{sp}/C$ of the refined polymer, the results being shown in Table 12 below.

Table 12

| Examples<br>Items | 62 | 63 | 64 |
|---|---|---|---|
| Kind of molecular weight controlling agent | n-hexane-1 | n-hexene-1 | butadiene |
| Mole % of said controlling agent based on the amount of the monomer | 0.4 | 2.0 | 0.4 |
| Conversion (%) | 41.8 | 42.5 | 36.6 |
| Properties of the crude polymer | Dark green | Brownish yellow | Brownish yellow |
| Properties of the refined polymer including the reduced viscosity $\eta_{sp}/C$ | Substantially colorless, transparent, with 1.04 $\eta_{sp}/C$ | Substantially colorless, transparent, with 0.52 $\eta_{sp}/C$ | Substantially colorless, transparent, with 0.99 $\eta_{sp}/C$ |

EXAMPLE 65

Ring-opening polymerization was conducted in the same manner as in Example 61, excepting that the monomer of 5-cyano bicyclo [2, 2, 1]-heptene-2 of Example 61 was replaced by 5-cyano-5-methyl bicyclo [2, 2, 1]-heptene-2. The polymer subjected to the same after treatment as in Example 1 presented a dark green color, the conversion rate being 38.4 percent. After refined in the same manner as in Example 1, the crude polymer became minutely yellow and transparent and indicated a reduced viscosity $\eta_{sp}/C$ of 1.88.

EXAMPLES 66 TO 68

Ring-opening polymerization was performed in the same manner as in Example 65, excepting that there were added to the reaction system the molecular weight controlling agents listed in Table 13 below in the mol percent given therein. The polymer obtained was subjected to the same after treatment and refining as in Example 1. Measurement was made of the conversion rate of the monomer, the properties of the crude and refined polymers and the reduced viscosity $\eta_{sp}/C$ of the refined polymer, the results being presented in Table 13 below.

Table 13

| Items \ Examples | 66 | 67 | 68 |
|---|---|---|---|
| Kind of molecular weight controlling agent | n-hexene-1 | n-hexene-1 | Butadiene |
| Mole % of said controlling agent based on the amount of the monomer | 0.4 | 2.0 | 0.4 |
| Conversion (%) | 39.9 | 42.5 | 23.8 |
| Properties of the crude polymer | Green | Brownish yellow | Brownish yellow |
| Properties of the refined polymer including the reduced viscosity $\eta_{sp}/C$ | Substantially colorless, transparent, with 0.93 $\eta_{sp}/C$ | Minutely yellow, transparent, with 0.44 $\eta_{sp}/C$ | Minutely yellow, transparent, with 0.84 $\eta_{sp}/C$ |

EXAMPLE 69

Ring-opening polymerization was carried out in the same manner as in Example 50, excepting that the 5-methyl-5-cyano bicyclo [2, 2, 1]-heptene-2 was replaced by 5,5-dicyano bicyclo [2, 2, 1]-heptene-2. A crude polymer obtained by the same after treatment as in Example 1 presented a dark greenish yellow color, the conversion rate being 40.1 percent. After refined as in Example 1, said crude polymer became minutely yellow and transparent, indicating a reduced viscosity $\eta_{sp}/C$ of 1.24.

EXAMPLE 70

Ring-opening polymerization was effected in the same manner as in Example 50, excepting that the 5-methyl-5-cyano bicyclo [2, 2, 1]-heptene-2 was replaced by 5,6-dicyano bicyclo [2, 2, 1]-heptene-2 (a product derived from the reaction of dicyclopentadiene with fumaronitrile). A crude polymer obtained by the same after treatment as in Example 1 presented a greenish yellow color, the conversion rate being 29.6 percent. After further refined in the same manner as in Example 1, the crude polymer became minutely yellow and transparent indicating a reduced viscosity $\eta_{sp}/C$ of 0.84.

EXAMPLE 71

Ring-opening polymerization was carried out in the same manner as in Example 50, excepting that the 5-methyl-5-cyano bicyclo [2, 2, 1]-heptene-2 was replaced by 5-cyanomethyl bicyclo [2, 2, 1]-heptene-2. When subjected to the same after treatment as in Example 1, the crude polymer produced displayed a greenish yellow color, the conversion rate being 68.9 percent. After further refined in the same manner as in Example 1, the crude polymer became minutely yellow and transparent, indicating a reduced viscosity $\eta_{sp}/C$ of 1.48.

EXAMPLE 72

Ring-opening polymerization was conducted in the same manner as in Example 50, excepting that the 5-methyl-5-cyano bicyclo [2, 2, 1]-heptene-2 was replaced by 5-cyano-6-phenyl bicyclo [2, 2, 1]-heptene-2. A crude polymer obtained by the same after treatment as in Example 1 displayed a greenish yellow color, the conversion rate being 59.2 percent. After further refined in the same manner as in Example 1, the crude polymer became minutely yellow and transparent, presenting a reduced viscosity $\eta_{sp}/C$ of 2.10.

EXAMPLE 73

Ring-opening polymerization was effected in the same manner as in Example 50, excepting that the 5-methyl-5-cyano bicyclo [2, 2, 1]-heptene-2 was replaced by a mixture of 5-ϵ-cyano-n-heptyl, 6-n-octenyl bicyclo [2, 2, 1]-heptene-2(A) and 5-ϵ-cyano-2-decenyl, 6-n-pentyl bicyclo [2, 2, 1]-heptene-2(B). A crude polymer obtained by the same after treatment as in Example 1 indicated a yellow color, the conversion being 19.3 percent. After further refined in the same manner as in Example 1, the crude polymer became minutely yellow and transparent, presenting a reduced viscosity $\eta_{sp}/C$ of 0.84.

Samples of sheeting 3mm thick were prepared from the polymers of Examples 69 to 72 by preheating 2 minutes at 190°C, thermally 3 minutes at said temperature at a pressure of 100 kg/cm² on a hot press and further pressing at a pressure of 50 kg/cm² on a water-cooled press. The samples had a surface hardness (Rockwell R) presented in Table 14 below.

Table 14

| Examples | Polymers | Hardness[2] |
|---|---|---|
| 69 | Polymer of 5,5-dicyano-bicyclo[2, 2, 1]-heptene-2 | 125 |
| 70 | Polymer of 5,6-dicyano-bicyclo[2, 2, 1]-heptene-2[1] | 124 |
| 71 | Polymer of 5-cyanomethyl-bicyclo[2, 2, 1]-heptene-2 | 120 |
| 72 | Polymer of 5-cyano-6-phenyl-bicyclo[2, 2, 1]-heptene-2 | 113 |

Notes:
[1] The monomer was prepared by the reaction of dicyclopentadiene with fumaronitrile.
[2] Measured at 20°C by the method of ASTM D-785-51

Control 1

Polymerization was attempted by the same process as in Example 8, excepting that the tungsten hexachloride of Example 8 was replaced by titanium tetrachloride. However, no polymer was produced.

Control 2

Polymerization was attempted by the same process as in Example 8, excepting that the tungsten hexachloride of Example 8 was replaced by vanadium pentachloride. However, no polymer was obtained.

Control 3

Polymerization was tried by the same process as in Example 1, excepting that the diethyl aluminium monochloride of Example 1 was replaced by n-butyl lithium. However, no polymer resulted.

Control 4

Under nitrogen atmosphere, a dry flask was filled with 100 parts by volume of a monomer of 5-cyano bicyclo [2, 2, 1]-heptene-2, 200 parts by volume of carbon tetrachloride and 5 mol percent of tungsten hexachloride based on the amount of said monomer. An attempt was made to polymerize the monomer by continuing reaction 20 hours at 60°C. However, no polymer appeared.

Control 5

Polymerization was tried in the same manner as in Control 4, excepting that the tungsten hexachloride of Control 4 was replaced by molybdenum pentachloride. However, no polymer was produced.

Control 6

Polymerization was attempted in the same manner as in Control 4, excepting that the tungsten hexachloride of Control 4 was replaced by diethyl aluminium monochloride. However, no polymer was obtained.

Control 7

Ring-opening polymerization was tried by the same process as in Example 22, excepting that the tungsten hexachloride of Example 22 was replaced by titanium tetrachloride. However, no polymer resulted.

Control 8

Ring-opening polymerization was tried by the same process as in Example 22, excepting that the tungsten hexachloride of Example 22 was replaced by vanadium pentachloride. However, no polymer appeared.

Control 9

Ring-opening polymerization was attempted by the same process as in Example 15, excepting that the diethyl aluminium monochloride of Example 15 was replaced by n-butyl lithium. However, no polymer was obtained.

Control 10

Polymerization was tried in the same manner as in Control 4, excepting that 5-cyano bicyclo[2, 2, 1]-heptene-2 was replaced by 5-cyano-5-methyl bicyclo[2, 2, 1]-heptene-2. However, no polymer was produced.

Control 11

Ring-opening polymerization was tried by the same process as in Control 10, excepting that the tungsten hexachloride of Control 10 was replaced by 5 mol percent of molybdenum pentachloride based on the amount of the monomer. However, no polymer resulted.

Control 12

Ring-opening polymerization was attemped by the same process as in Control 10, excepting that the tungsten hexachloride was replaced by 4 mol percent of diethyl aluminium monochloride based on the amount of the monomer. However, no polymer appeared.

What we claim is:

1. Polymers prepared with a reduced viscosity of 0.1 to 20 by ring-opening polymerization of cyano-substituted norbornene derivatives expressed by the following general formula

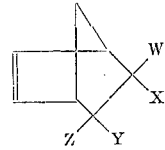

where:
W, X, Y and Z = radicals selected from the group consisting of hydrogen, nitrile group, substituents containing nitrile group, alkyl radical having 1 to 20 carbon atoms, alkenyl radical having 6 to 20 carbon atoms, aryl radical having 1 to 20 carbon atoms and aralkyl radical having 1 to 20 carbon atoms, at least one of said W, X, Y and Z radicals being selected from the group consisting of nitrile group and the substituents containing nitrile group.

2. Polymers according to claim 1 wherein the substituents containing nitrile group are selected from the group consisting of the cyanomethyl radical, cyanoethyl radical, cyanopropyl radical, cyano-n-butyl radical, cyano-isobutyl radical and ω-cyano-n-heptyl radical.

3. Polymers according to claim 1 wherein the cyano-substituted norbornene derivatives are selected from the group consisting of 5-cyano bicyclo [2, 2, 1]-heptene-2, 5-cyano-5-methyl bicyclo [2, 2, 1]-heptene-2, 5-cyano-5-n-octyl bicyclo [2, 2, 1]-heptene-2, 5,5-dicyano bicyclo [2, 2, 1]-heptene-2, 5,6-dicyano bicyclo [2, 2, 1]-heptene-2, 5-cyano -6-phenyl bicyclo [2, 2, 1-ω-heptene-2, and a mixture of 5--cyano-n-heptyl, 6-n-2-octenyl bicyclo [2, 2, 1]-heptene-2 and 5-ω-cyano-2-decenyl, 6-n-pentyl bicyclo [2, 2, 1]-heptene-2.

4. A method for manufacturing the polymers of cyano-substituted norbornene derivatives expressed by the general formula

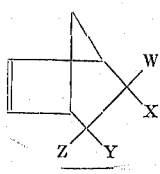

where:
W, X, Y and Z = radicals selected from the group consisting of hydrogen, nitrile group, substituents containing nitrile group, alkyl radical having 1 to 20 carbon atoms, aryl radical having 6 to 20 carbon atoms, alkenyl radical having 7 to 20 carbon atoms and aralkyl radical having 1 to 20 carbon atoms, at least one of said W, X, Y and Z radicals being selected from the group consisting of nitrile group and the substituents containing nitrile group which comprises subjecting said cyano-substituted norbornene derivatives to ring-opening polymerization in the presence of a catalytic system consisting of organic aluminium compounds and at least one selected from the group consisting of compounds of tungsten and those of molybdenum.

5. A method according to claim 4 wherein the ring-opening polymerization is effected in the presence of a catalytic system prepared by adding to the catalytic system of claim 4 at least one compound selected from the group consisting of water, peroxides, epoxides, organic halides, acetal compounds, orthocarboxylic acid esters and alcoholic compounds.

6. A method according to claim 4 wherein the ring-opening polymerization is carried out in the presence of an organic solvent.

7. A method according to claim 5 wherein the ring-opening polymerization is conducted in the presence of an organic solvent.

8. A method according to claim 4 wherein the organic aluminium compounds are selected from the group consisting of compounds represented by the general formulas $AlR_3$, $AlR_nX_{3-n}$ and a mixture of compounds represented by said general formula $AlR_3$ and water (in which the mol ratio of $H_2O$ to $AlR_3$ has a value of <1.5) where R is a radical selected from the group consisting of the alkyl radical and aryl radical, X is a radical selected from the group consisting of halogens, hydrogen and alkoxy radical, and $n$ is 1, 1.5 and 2.

9. A method according to claim 5 wherein the organic aluminium compounds are selected from the group consisting of compounds represented by the general formulas $AlR_3$, $AlR_nX_{3-n}$ and a mixture of compounds represented by said general formula $AlR_3$ and water (in which the mol ratio of $H_2O$ to $AlR_3$ has a value of <1.5) where R is a radical selected from the group consisting of the alkyl radical and aryl radical, X is a radical selected from the group consisting of halogens, hydrogen and alkoxy radical, and $n$ is 1, 1.5 and 2.

10. A method according to claim 8 wherein compounds expressed by the general formula $AlR_3$ are selected from the group consisting of trimethyl aluminium, triethyl aluminium, tri-n-propyl aluminium, tri-isopropyl aluminium, tri-isobutyl aluminium, trihexyl aluminium, trioctyl aluminium, tribenzyl aluminium, and triphenyl aluminium.

11. A method according to claim 9 wherein compounds expressed by the general formula $AlR_3$ are selected from the group consisting of trimethyl aluminium, triethyl aluminium, tri-n-propyl aluminium, tri-isopropyl aluminium, tri-isobutyl aluminium, trihexyl aluminium, trioctyl aluminium, tribenzyl aluminium, and triphenyl aluminium.

12. A method according to claim 8 wherein the compounds expressed by the general formula $AlR_nX_{3-n}$ are selected from the group consisting of diethyl aluminium monochloride, di-n-propyl aluminium monochloride, diisobutyl aluminium monochloride, di-n-butyl aluminium monochloride, diethyl aluminium monobromide, diethyl aluminium monoiodide, diethyl aluminium monohydride, di-n-propyl aluminium monohydride, diisobutyl aluminium monohydride, dibenzyl aluminium monochloride, diphenyl aluminium monochloride, dibenzyl aluminium monobromide, ditolyl aluminium monochloride, diethyl aluminium monoethoxide, diisobutyl aluminium monobutoxide, ethyl aluminium sesquichloride, ethyl aluminium sesquibromide, isobutyl aluminium sesquichloride, ethyl aluminium dichloride, ethyl aluminium dibromide, propyl aluminium dichloride, isobutyl aluminium dichloride, ethyl aluminium diiodide, benzyl aluminium dichloride, benzyl aluminium dibromide, and ethyl aluminium diethoxide.

13. A method according to claim 9 wherein the compounds expressed by the general formula $AlR_nX_{3-n}$ are selected from the group consisting of diethyl aluminium monochloride, di-n-propyl aluminium monochloride, diisobutyl aluminium monochloride, di-n-butyl aluminium monochloride, diethyl aluminium monobromide, diethyl aluminium monoiodide, diethyl aluminium monohydride, di-n-propyl aluminium monohydride, diisobutyl aluminium monohydride, dibenzyl aluminium monochloride, diphenyl aluminium monochloride, dibenzyl aluminium monobromide, ditolyl aluminium monochloride, diethyl aluminium monoethoxide, diisobutyl aluminium monobutoxide, ethyl aluminium sesquichloride, ethyl aluminium sesquibromide, isobutyl aluminium sesquichloride, ethyl aluminium dichloride, ethyl aluminium dibromide, propyl aluminium dichloride, isobutyl aluminium dichloride, ethyl aluminium diiodide, benzyl aluminium dichloride, benzyl aluminium dibromide, and ethyl aluminium diethoxide.

14. A method according to claim 8 wherein the mixture of compounds expressed by the general formula $AlR_3$ and water consists of triethyl aluminium and water mixed in the mol ratio of 1:0.5.

15. A method according to claim 9 wherein the mixture of compounds expressed by the general formula $AlR_3$ and water consists of triethyl aluminium and water mixed in the mol ratio of 1:0.5.

16. A method according to claim 4 wherein the compounds of tungsten are selected from the group consisting of tungsten pentachloride, tungsten hexachloride, tungsten pentafluoride, tungsten hexafluoride, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and $Al_4W_3Cl_{18}$.

17. A method according to claim 5 wherein the compounds of tungsten are selected from the group consisting of tungsten pentachloride, tungsten hexachloride, tungsten pentafluoride, tungsten hexafluoride, tungsten oxytetrachloride, tungsten oxytetrabromide, tungsten oxydichloride, tungsten hexaalcoholate, tungsten hexaphenolate, tetrachlorotungsten diphenolate, tetrachlorotungsten dialcoholate, and $Al_4W_3Cl_{18}$.

18. A method according to claim 4 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxydiacetyl acetonate, dichloromolybdenum dialcoholate, and dichloromolybdenum triphenolate.

19. A method according to claim 5 wherein the compounds of molybdenum are selected from the group consisting of molybdenum pentachloride, molybdenum hexachloride, molybdenum pentafluoride, molybdenum hexafluoride, molybdenum pentabromochloride, molybdenum pentabromide, molybdenum oxytrichloride, molybdenum oxytetrachloride, molybdenum dioxydiacetyl acetonate, dichloromolybdenum dialcoholate, and dichloromolybdenum triphenolate.

20. A method according to claim 5 wherein the peroxides are selected from the group consisting of t-butyl peroxide, benzoyl peroxide, t-butyl hydroperoxide, cumene hydroperoxide, hydrogen peroxide, peracetic acid, and esters, ketones and aldehydes all derived from peracetic acid.

21. A method according to claim 5 wherein the epoxides are selected from the group consisting of ethylene oxide, propylene oxide, butene-1 oxide, epichlorohydrin, allyl glycidyl ethers, and butadiene monoxide.

22. A method according to claim 5 wherein the organic halides are selected from the group consisting of t-butyl hypoharites, allyl chloride, t-butyl chloride, α-chloroacetone, and 2-chloroethanol.

23. A method according to claim 5 wherein the acetal compounds are selected from the group consisting of acetaldehyde diethyl acetal, diethoxy methane, acetone dimethyl acetal, and dichloroacetaldehyde dimethyl acetal.

24. A method according to claim 5 wherein the alcoholic compounds are selected from the group consisting of methyl alcohol, ethyl alcohol, n-propyl alcohol, n-butyl alcohol, isobutyl alcohol, and phenol.

25. A method according to claim 5 wherein the orthocarboxylic acid esters are selected from the group consisting of orthomethyl formate, and orthoethyl formate.

26. A method according to claim 6 wherein the organic solvents are selected from the group consisting of pentane, hexane, petroleum ethers, decane, benzene, toluene, xylene, cyclohexane, decalin, cyclooctane, methylene chloride, 1,2-dichloroethane, 1,2-dichloropropane, chloroform, chlorobenzene, and carbon tetrachloride.

27. A method according to claim 7 wherein the organic solvents are selected from the group consisting of pentane, heptane, hexane, petroleum ethers, decane, benzene, toluene, xylene, cyclohexane, decalin, cyclooctane, methylene chloride, 1,2-dichloroethane, 1,2-dichloropropane, chloroform, chlorobenzene, and carbon tetrachloride.

28. A method according to claim 4 which comprises further adding to the reaction system a molecular weight controlling agent selected from the group consisting of α-olefins, internal olefins, conjugate diolefins, and nonconjugate diolefins.

29. A method according to claim 5 which comprises further adding to the reaction system a molecular weight controlling agent selected from the group consisting of α-olefins, internal olefins, conjugate diolefins, and nonconjugate diolefins.

30. A method according to claim 4 wherein the ring-opening polymerization is carried out at a temperature ranging from −100°C to +200°C.

31. A method according to claim 5 wherein the ring-opening polymerization is carried out at a temperature ranging from −100°C to +200°C.

* * * * *